(12) United States Patent
Sohn

(10) Patent No.: US 12,744,052 B2
(45) Date of Patent: Sep. 22, 2026

(54) APPARATUS FOR ESTIMATING EMOTION USING MULTIMODAL MODEL AND METHOD OF TRAINING THE SAME

(71) Applicant: EMMA HEALTHCARE CO., LTD., Seongnam-si (KR)

(72) Inventor: Ryanghee Sohn, Seongnam-si (KR)

(73) Assignee: EMMA HEALTHCARE CO., LTD., Seongnam-si (KR)

(*) Notice: Subject to any disclaimer, the term of this patent is extended or adjusted under 35 U.S.C. 154(b) by 170 days.

(21) Appl. No.: 18/792,131

(22) Filed: Aug. 1, 2024

(65) Prior Publication Data

US 2025/0285641 A1 Sep. 11, 2025

(30) Foreign Application Priority Data

Mar. 8, 2024 (KR) ........................ 10-2024-0033415
Mar. 8, 2024 (KR) ........................ 10-2024-0033423

(51) Int. Cl.

| | |
|---|---|
| ***G10L 25/63*** | (2013.01) |
| ***G10L 15/02*** | (2006.01) |
| ***G10L 15/187*** | (2013.01) |
| ***G10L 25/30*** | (2013.01) |

(52) U.S. Cl.

CPC .............. *G10L 25/63* (2013.01); *G10L 15/02* (2013.01); *G10L 15/187* (2013.01); *G10L 25/30* (2013.01)

(58) Field of Classification Search

CPC ........................................................ G10L 25/63
See application file for complete search history.

(56) References Cited

U.S. PATENT DOCUMENTS

| | | | | |
|---|---|---|---|---|
| 2023/0197106 A1* | 6/2023 | Alisamir | G10L 25/63 704/235 |
| 2024/0419945 A1* | 12/2024 | Wu | G10L 15/1815 |
| 2025/0157457 A1* | 5/2025 | Huang | G10L 13/027 |
| 2026/0024522 A1* | 1/2026 | Wang | G10L 15/063 |

OTHER PUBLICATIONS

Khan, Mustaqeem, et al. "MSER: Multimodal speech emotion recognition using cross-attention with deep fusion." Expert Systems with Applications 245 (2024): 122946. Available online Dec. 15, 2023 (Year: 2023).*

Makiuchi, Mariana Rodrigues, Kuniaki Uto, and Koichi Shinoda. "Multimodal emotion recognition with high-level speech and text features." 2021 IEEE automatic speech recognition and understanding workshop (ASRU). IEEE, 2021. (Year: 2021).*

* cited by examiner

*Primary Examiner* — Douglas Godbold
(74) *Attorney, Agent, or Firm* — Fish IP Law, LLP

(57) ABSTRACT

An apparatus capable of estimating emotion includes an SER model processing unit that inputs an acquired speaker identity feature and speaker speech data feature to a predetermined SER model, and outputs a phonetic feature query, a phonetic feature key, and a phonetic feature value through a process, a TER model processing unit that outputs a text feature query, a text feature key, and a text feature value of the text feature through a process from transferred text corresponding to the speaker identity feature and the speaker speech data feature, and an RF model processing unit that inputs the output phonetic feature query, phonetic feature key, and phonetic feature value of the speaker and the output text feature query, text feature key, and text feature value to a predetermined RF model, and outputs a probability for each emotion category of the speaker by applying a cross-attention mechanism.

10 Claims, 5 Drawing Sheets

FIG. 4

| EMOTION CATEGORY | EMOTION PROBABILITY |
| --- | --- |
| ANGER | 81.2% |
| DISGUST | 7.2% |
| FEAR | 4.2% |
| JOY | 1.4% |
| SADNESS | 6.9% |
| SURPRISE | 7.2% |

APPARATUS FOR ESTIMATING EMOTION USING MULTIMODAL MODEL AND METHOD OF TRAINING THE SAME

This application claims the benefit of Korean Patent Application No. 10-2024-0033415, filed on Mar. 8, 2024 and No. 10-2024-0033423, filed on Mar. 8, 2024, which are hereby incorporated by reference as if fully set forth herein.

BACKGROUND OF THE INVENTION

Field of the Invention

The present invention relates to an apparatus for estimating emotion, and more particularly to an apparatus and method for estimating emotion by effectively fusing a plurality of modalities corresponding to speech information of a user and text information to which speech thereof is transferred, and a method of training the apparatus.

Description of the Related Art

Emotion is an important tool to represent people. Conveying emotion enriches communication and enhances the meaning of human existence. Humans express emotions through facial expressions, gestures, voice, and language. In addition, emotion may be expressed and recognized mainly in a communication process. Since communication is generally performed through conversation, studies that attempt to recognize emotion in conversations mainly utilize speech or text data. Emotion recognition in conversations is a significantly important and challenging task in natural human-machine interaction, intelligent educational tutoring, and mental health analysis applications. In everyday life, people have multi-turn conversations that convey emotional states in a variety of ways. This is achieved through verbal and non-verbal content (for example, facial expressions and body language), each different modality contains information related to emotion, and active research focuses on a method of efficiently and effectively fusing these diverse inputs.

In everyday life, text modality is frequently used together with audio modality. Emotional content included in a text function is complemented by various information such as pitch, loudness, and other frequency-related measurements. Effective interaction between text and audio data may provide more comprehensive content and provide more information on emotion. However, effective fusion of various modalities remains a significantly challenging task. Even though a lot of single-modal emotion recognition technologies have been previously developed, key challenges still exist in multi-modal emotion recognition. Different modalities rely on independent preprocessing and feature extraction design due to heterogeneous spaces. To create a generalizable model applicable to both individual modality and fusion model, intra- and cross-modal interactions need to be learned to reveal differential emotion content.

Most conventional emotion recognition studies are concentrated on single-modal emotion recognition such as audio/speech, facial expressions, text, etc. Despite the fact that single-modal emotion recognition has made great progress, single-modal emotion recognition has the following problems.

First, emotion modeling in single form cannot accurately characterize emotional states of people. A reason therefor is that humans express emotion in various ways.

Second, since multimodal data of different modalities may be interrelated or complementary in the ultimate emotion recognition work, single modal data cannot contain complete emotion meaning information. To solve this problem, researchers have been trying to expand relatively simple single-modal emotion recognition into complex multimodal emotion recognition (MER). Multimodal emotion recognition has an advantage in that knowledge of various sources may be utilized.

When compared to single-modal emotion recognition, emotion recognition related to emotion expression of a human, in particular, human language, mainly includes hearing expression and text expression. In this case, audio and text forms may provide emotional information important to identify human emotional states in a complementary way. Thus, integrating audio and text clues is known to have a great potential for building an effective multimodal emotion recognition model.

However, great inconsistency between audio and text data due to highly heterogeneous characteristics of multimodal data causes great difficulties in fusing audio and text forms in a multimodal emotion recognition process. Therefore, effective multimodal data fusion strategies that integrate heterogeneous audio and text data are significantly important in a basic multimodal emotion recognition system. In early multimodal emotion recognition studies, to alleviate this problem, three types of typical multifunctional fusion, for example, a modal data fusion approach method (for example, initial fusion), decision making-level fusion (for example, later fusion), and model-level fusion have been widely used to fuse audio and text clues.

Feature-level fusion is a simplest fusion method that directly connects different features extracted from multimodal modalities to long feature vectors by latter classifier input. However, there is a disadvantage in that this simple functional connection does not take into account dynamic characteristics between modes considering the temporal scale. In addition, feature-level fusion may easily suffer the curse of dimensionality due to a connected high-level feature vector.

In contrast, decision making-level fusion aims to model different modalities independently, and has used specific calculation rules such as average and maximum. Nevertheless, decision making-level fusion cannot accurately reflect an interrelationship between forms.

Model-level fusion aims to explicitly utilize a correlation between different forms, and thus is a compromise between characteristic level and decision making-level fusion methods. Multi-kernel learning and deep learning technique have been used as a representative model-level fusion method. In recent years, various attention-based deep learning models may be broadly classified into two groups. An inter-modal attention-based method and an intra-modal attention-based method have been applied to multi-modal emotion recognition.

There is some indication that the inter-modal attention-based method focuses a dynamic interaction between different modalities and ignores unique connection between feature elements of a single modality. On the other hand, the intra-modal attention-based method focuses on extracting emotionally-noticeable feature representation in a single modality, and thus ignores a relationship between different modalities. In this sense, an intra-modality relationship in a single modality and an inter-modality relationship between different modalities may improve each other to some extent. However, most previous studies do not sufficiently consider inter-modal and intra-modal attention mechanisms, and thus it is difficult to expect potential performance improvement in multimodal emotion recognition by jointly learning emotionally noticeable information in a modality and between modalities.

Feature extraction and emotion categorization are two key stages for single model emotion recognition. Feature extraction is the extraction of feature representation associated with emotion representation in a single model having a correlation. Emotion categorization aims to use a suitable classifier to obtain a final emotion recognition result by learning a mapping relationship between extracted feature representation and an emotion label. As an existing machine learning method, hidden Markov model (HMM), support vector machine (SVM), Bayesian network (BN), K-recent neighbor (KNN), multilayered perceptron (MLP), decision tree, etc. have been widely used as emotion classifiers for single mode emotion recognition.

Emotional sound feature extraction is significantly important for audio emotion recognition. A general sound feature used in the first stage is sound low-level description (LLD) made by hand, such as a rhyme feature, a speech quality feature, and a spectrum feature. A general rhyme feature includes pitch, volume, and duration. Examples of a general speech quality feature include formant, spectrum energy distribution, glottides feature, and speech source parameter. Examples of a representative spectrum feature include Mel-Frequency Cepstral Coefficients (MFCC). Such sound LLD made by hand exhibits excellent performance in audio emotion recognition, which is still at a low level, and thus there is a big emotional gap between a feature made by hand and subjective emotion.

Recently introduced deep learning techniques are widely applied to audio emotion recognition due to powerful feature learning functions. Deep learning methods commonly used for audio emotion recognition include deep convolutional neural networks (CNN), recurrent neural networks (RNN), and LSTM, which is a variant thereof.

Text emotion recognition is a technology that automatically recognizes an emotional state in text representation using a text feature. Feature extraction methods commonly used in early text emotion recognition research include hand-crafted bag of words (BoW) model, latent Dirichlet allocation (LDA), and latent semantic analysis (LSA). However, these handcrafted models have the limitation of not being able to capture high-dimensional semantic information hidden behind text data. To alleviate the problems mentioned above, deep learning techniques have also been used to improve performance of text emotion recognition in recent years. Several representative word embedding methods previously used for training such as Word2vec and GloVe have also been used for text emotion analysis. Recently, various language models pre-trained in a field of natural language processing (NLP), such as contextualized word vector (CoVe), embedding from language model (ELMo), and bidirectional encoder representation from transformer (BERT), have been adopted in text emotion classification.

In this respect, this technology aims to develop a multimodal emotion recognition model that simultaneously utilizes speech and text data.

SUMMARY OF THE INVENTION

A technical task to be achieved in the present invention is to provide an apparatus capable of estimating emotions of a user.

Another technical task to be achieved in the present invention is to provide a method capable of estimating emotion of the user.

Another technical task to be achieved in the present invention is to provide a computer-readable recording medium storing a computer program that executes the method capable of estimating emotion of the user on a computer.

Another technical task to be achieved in the present invention is to provide a method of training the apparatus capable of estimating emotion of the user.

Yet another task to be achieved in the present invention is to provide a computer-readable recording medium storing a computer program that executes, on a computer, a training method for outputting an emotion category probability of the apparatus capable of estimating emotion to the user.

The technical tasks to be achieved in the present invention are not limited to the technical tasks mentioned above, and other technical tasks not mentioned here may be clearly understood by those who have common knowledge in the technical field to which the present invention pertains from the following description.

In accordance with an aspect of the present invention, the above and other objects can be accomplished by the provision of an apparatus for estimating emotion, the apparatus including a speech emotion representation (SER) model processing unit configured to input an acquired speaker identity feature and an acquired speaker speech data feature to a predetermined SER model, encode the speaker identity feature and the speaker speech data feature through a speech encoder in the SER model, and encode the encoded speaker identity feature and speaker speech data feature through a disentangled feature encoder to output a phonetic feature query, a phonetic feature key, and a phonetic feature value of a speaker, a text emotion representation (TER) model processing unit configured to input a text feature acquired from transferred text corresponding to the speaker identity feature and the speaker speech data feature to a predetermined TER model, and encode the text feature through a text encoder in the TER model to output a text feature query, a text feature key, and a text feature value of the text feature, and a representation fusion (RF) model processing unit configured to input the output phonetic feature query, phonetic feature key, and phonetic feature value of the speaker and the output text feature query, text feature key, and text feature value to a predetermined RF model, and output a probability for each emotion category of the speaker by applying a cross-attention mechanism.

The speaker identity feature and the speaker speech data feature encoded by the speech encoder in the SER model processing unit may correspond to speech representation encoded before down-sampling is applied.

The cross-attention mechanism: in the RF model processing unit may include at least one of a first cross-attention mechanism to which the acquired phonetic feature query, text feature key, and text feature value are applied or a second cross-attention mechanism to which the acquired text feature query, phonetic feature key, and phonetic feature value are applied.

The RF model processing unit may output, to the user, an emotion category having a highest probability among probability output values for respective emotion categories of the speaker.

The speaker speech data feature in the SER model processing unit may be a wav2vec feature or a wav2vec2.0 feature extracted from a predetermined speech recognition pre-learning model.

In accordance with another aspect of the present invention, there is provided a method of estimating emotion of a user, the method including inputting an acquired speaker identity feature and an acquired speaker speech data feature to a predetermined SER model, encoding the speaker identity feature and the speaker speech data feature through a speech encoder in the SER model, encoding the encoded speaker identity feature and speaker speech data feature through a disentangled feature encoder to output a phonetic feature query, a phonetic feature key, and a phonetic feature value of a speaker, inputting a text feature acquired from transferred text corresponding to the speaker identity feature and the speaker speech data feature to a predetermined TER model, encoding the text feature through a text encoder in the TER model to output a text feature query, a text feature key, and a text feature value of the text feature, and inputting the output phonetic feature query, phonetic feature key, and phonetic feature value of the speaker and the output text feature query, text feature key, and text feature value to a predetermined RF model, and outputting a probability for each emotion category of the speaker by applying a cross-attention mechanism.

In the encoding the speaker identity feature and the speaker speech data feature through a speech encoder, the speaker identity feature and the speaker speech data feature encoded by the speech encoder may correspond to speech representation encoded before down-sampling is applied.

The outputting a probability for each emotion category of the speaker may include applying at least one of a first cross-attention mechanism to which the acquired phonetic feature query, text feature key, and text feature value are applied or a second cross-attention mechanism to which the acquired text feature query, phonetic feature key, and phonetic feature value are applied.

The outputting a probability for each emotion category of the speaker may include outputting, to the user, an emotion category having a highest probability among probability output values for respective emotion categories of the speaker.

In accordance with a further aspect of the present invention, there is provided a method of training an apparatus capable of estimating emotion of a user, the method including inputting an acquired speaker identity feature, an acquired speaker speech data feature, an acquired phonetic feature, and an acquired mel spectrogram to a predetermined SER model, encoding the speaker identity feature and the speaker speech data feature by a speech encoder in the SER model, encoding the acquired phonetic feature by a phonetic feature encoder in the SER model, decoding the speaker identity feature, the encoded speaker identity feature and speaker speech data feature, and the encoded phonetic feature by a speech decoder in the SER model, and designating the acquired mel spectrogram as a reference truth label and converting a result of the speech decoder into a mel spectrogram for training.

The encoding by a speech encoder may include down-sampling speech representation including the acquired speaker identity feature and the acquired speaker speech data feature, and the decoding by a speech decoder may include up-sampling the down-sampled speech representation.

The decoding by a speech decoder may include concatenating at least one of the speaker identity feature or the encoded phonetic feature with a result of up-sampling the speaker identity feature and the speaker speech data feature.

In accordance with a further aspect of the present invention, there is provided a method of training an apparatus capable of estimating emotion of a user, the method including inputting an acquired speaker identity feature and an acquired speaker speech data feature to a predetermined SER model, encoding the speaker identity feature and the speaker speech data feature through a speech encoder in the SER model, encoding the encoded speaker identity feature and speaker speech data feature through a disentangled feature encoder to output a phonetic feature query, a phonetic feature key, and a phonetic feature value of a speaker, inputting a text feature acquired from transferred text corresponding to the speaker identity feature and the speaker speech data feature to a predetermined TER model, encoding the text feature through a text encoder in the TER model to output a text feature query, a text feature key, and a text feature value of the text feature, inputting the output phonetic feature query, phonetic feature key, and phonetic feature value of the speaker and the output text feature query, text feature key, and text feature value to a predetermined RF model, and outputting a probability for each emotion category of the speaker by applying a cross-attention mechanism, and performing training using the output probability for each emotion category of the speaker as a probability for each emotion category designated by a reference truth label.

The method may further include performing training using an emotion category designated by a reference truth label and an emotion category having a highest probability among probabilities for respective emotion categories of the speaker output through the predetermined RF model.

In the encoding the acquired speaker identity feature and the acquired speaker speech data feature through a speech encoder, the speaker identity feature and the speaker speech data feature encoded through the speech encoder may correspond to encoded speech representation before down-sampling is applied.

The outputting a probability for each emotion category of the speaker may include applying at least one of a first cross-attention mechanism to which the acquired phonetic feature query, text feature key, and text feature value are applied or a second cross-attention mechanism to which the acquired text feature query, phonetic feature key, and phonetic feature value are applied.

In accordance with a further aspect of the present invention, there is provided an apparatus for performing training to estimate emotion of a user, the apparatus including an SER model processing unit configured to input an acquired speaker identity feature, an acquired speaker speech data feature, an acquired phonetic feature, and an acquired mel spectrogram to a predetermined SER model, encode the speaker identity feature and the speaker speech data feature using a speech encoder in the SER model, encode the acquired phonetic feature using a phonetic feature encoder in the SER model, decode the speaker identity feature, the encoded speaker identity feature and speaker speech data feature, and the encoded phonetic feature using a speech decoder in the SER model, and designate the acquired mel spectrogram as a reference truth label and convert a result of the speech decoder into a mel spectrogram for training.

The speech encoder may perform down-sampling after the encoding, and the speech decoder may perform up-sampling before the decoding on the encoded speaker identity feature and speaker speech data feature.

In accordance with a further aspect of the present invention, there is provided an apparatus for performing training to estimate emotion of a user, the apparatus including an SER model processing unit configured to input an acquired speaker identity feature and an acquired speaker speech data feature to a predetermined SER model, encode the speaker identity feature and the speaker speech data feature using a speech encoder in the SER model, and encode the encoded speaker identity feature and speaker speech data feature through a disentangled feature encoder to output a phonetic feature query, a phonetic feature key, and a phonetic feature value of a speaker, a TER model processing unit configured to input a text feature acquired from transferred text corresponding to the speaker identity feature and the speaker speech data feature to a predetermined TER model, and encode the text feature through a text encoder in the TER model to output a text feature query, a text feature key, and a text feature value of the text feature, and an RF model processing unit configured to input the output phonetic feature query, phonetic feature key, and phonetic feature value of the speaker and the output text feature query, text feature key, and text feature value to a predetermined RF model, output a probability for each emotion category of the speaker by applying a cross-attention mechanism, and perform training using the output probability for each emotion category of the speaker as a probability for each emotion category designated by a reference truth label.

The RF model processing unit may perform training using an emotion category designated by a reference truth label and an emotion category having a highest probability among probabilities for respective emotion categories of the speaker output through the predetermined RF model.

BRIEF DESCRIPTION OF THE DRAWINGS

To assist in understanding of the present invention, the attached drawings, which are included as part of a detailed description, provide embodiments of the present invention and describe the technical idea of the present invention together with the detailed description.

FIG. 4 is a diagram for schematically describing a probability of each emotion category, which is an output result of the apparatus capable of estimating emotion of the user according to an embodiment of the present invention.

DETAILED DESCRIPTION OF THE INVENTION

Figure 1:
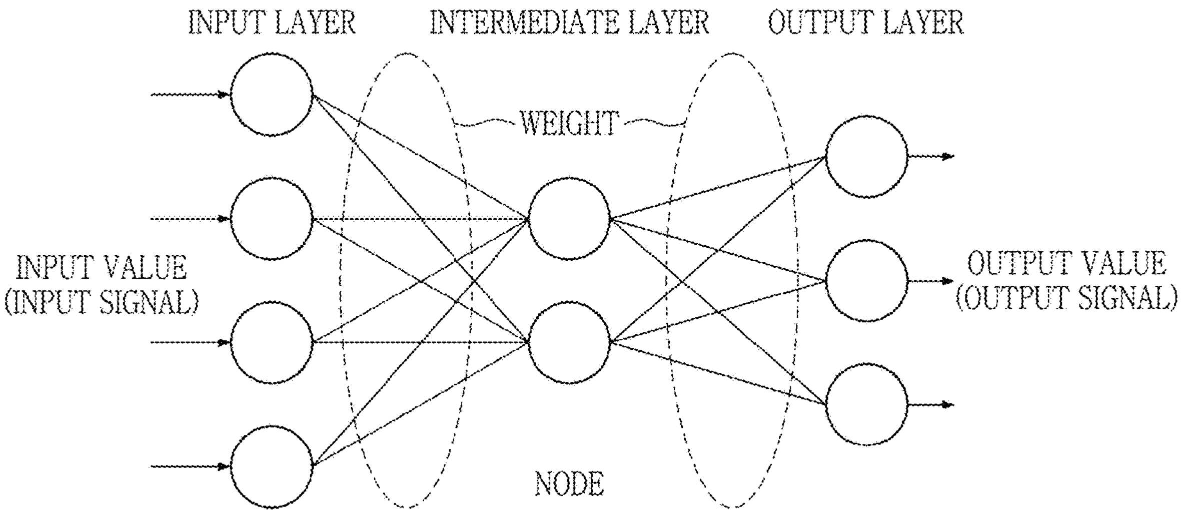
FIG. 1 is a diagram illustrating a layer structure of an artificial neural network.

Hereinafter, preferred embodiments of the present invention will be described in detail with reference to the accompanying drawings. The detailed description disclosed hereinafter together with the accompanying drawings shows exemplary embodiments of the present invention and does not reveal a unique embodiment by which the present invention can be implemented. The following detailed description includes specific details in order to provide complete understanding of the present invention. However, those skilled in the art will appreciate that the present invention can be implemented without such specific details.

Since the present: invention may undergo various changes and have various forms, specific embodiments will be illustrated in the drawings and described in detail in the text. However, this is not intended to limit the present invention to a specific form disclosed, and should be understood to include all modifications, equivalents, or substitutes included in the spirit and scope of the present invention.

When a component is mentioned as being "coupled" or "connected" to another component, it is understood that the component may be directly coupled or connected to another component, and still another component may be present therebetween. On the other hand, when a component is mentioned as being "directly coupled" or "directly connected" to another component, it should be understood that there are no other components therebetween.

Even though terms such as first and second may be used to describe various components, the components should not be limited by the terms. The terms are only used for the purpose of distinguishing one component from another.

The terms used herein are only used to describe specific embodiments and are not intended to limit the present invention. The singular expression includes the plural expression unless the context clearly dictates otherwise. In the present specification, it should be understood that a term such as "include" or "have" is intended to designate that the features, numbers, steps, operations, elements, parts, or combinations thereof described in the specification are present, and does not preclude the possibility of addition or presence of one or more other features, numbers, steps, operations, elements, parts, or combinations thereof.

In addition, terms such as " . . . section," " . . . unit," " . . . module," and " . . . device" used in the specification each refer to a unit that processes at least one function or operation, which may be implemented as hardware, software, or a combination of hardware and software.

In some cases, in order to avoid the concept of the present invention being ambiguous, a well-known structure and apparatus may be omitted, or each structure and apparatus will be shown in the form of a block diagram including core functions thereof. In addition, the same elements are denoted by the same reference numerals throughout this specification.

The present invention proposes an apparatus and method for estimating emotion of a user using multimodal data of different modalities corresponding to speech and text, and a method of training the apparatus for estimating emotion. An algorithm model proposed in the present invention may more accurately estimate emotion of the user by effectively fusing modalities corresponding to acquired speech and text.

Before describing the present invention, artificial intelligence (AI), machine learning, and deep learning will be described. As a method of most easily understanding the relationship among the three concepts, three concentric circles may be imagined. Artificial intelligence may be the outermost circle, machine learning may be the middle circle, and deep learning, which leads a current artificial intelligence boom, may be the innermost circle.

The concept of artificial intelligence first appeared in the Dartmouth workshop held by Professor John Mccarthy at Dartmouth College, USA in the year of 1956, and has explosively grown in recent years. In particular, artificial intelligence has been further accelerated as the result of introduction of a GPU, which has provided rapid and strong parallel processing performance since 2015. The advent of the big data era with ever-expanding storage capacity and numerous data in all areas, such as images, text, and mapping data, had a great influence on such growth of artificial intelligence.

Artificial Intelligence-Human Intelligence Implemented by Machine

In 1956, artificial intelligence pioneers dreamt of manufacturing a complex computer having similar characteristics to human intelligence. Artificial intelligence that thinks like a human being while having sense and thinking power of the human being is called a "general AI", whereas artificial intelligence that can be made at the level of the current technological advancement is included in the concept of "narrow AI". Narrow AI is characterized in that it is possible to perform specific tasks, such as an image sorting service or a facial recognition function on social media, with greater than human ability.

Machine Learning-Specific Approach That Implements Artificial Intelligence

Machine learning serves to automatically filter spam in a mailbox. Meanwhile, basically, machine learning analyzes data using an algorithm, learns through analysis, and performs determination or prediction based on what has been learned. Ultimately, therefore, machine learning aims to "train" a computer itself using a large amount of data and the algorithm so as to learn a task execution method, instead of specific guidelines for decision making being directly coded in software. Machine learning came from the concept that early artificial intelligence researchers directly advocated, and decision tree learning, inductive logic programming, clustering, reinforcement learning, and a Bayesian network are included in algorithm schemes. However, none thereof has achieved general AI, which is the final target, and there were many cases in which it was difficult to complete even narrow AI using an initial machine learning approach.

Although machine learning is making great achievements in the field of computer vision at the present time, machine learning encountered the limitation in that a predetermined amount of coding work is accompanied over a process of implementing artificial intelligence, even if there are no specific guidelines. When an image of a stop sign is recognized using a machine learning system, for example, a developer must directly manufacture a border sensing filter that identifies a start part and an end part of an object using a program, shape sensing that determines the surface of the object, and a classifier that recognizes letters such as "S-T-O-P" by coding. Like this, machine learning is operated in a manner in which the image is recognized from the "coded" classifier and the stop sign is "learned" through an algorithm.

A machine learning training method finds a most appropriate model by adjusting parameters of a model so that an error between a target value and a predictive value is minimized. Here, the predictive value refers to a value output when an input value is entered into a model, that is, an output value. For example, a model including an arbitrary number of convolution layers, bidirectional LSTMs, feedforward layers, etc. changes each of the convolution layers, bidirectional LSTMs, and feedforward layers so that an error with respect to a target value is minimized as training progresses.

An image recognition rate of machine learning is sufficient in performance to be commercialized. In a specific situation in which the sign is invisible due to fog or trees, however, the image recognition rate of machine learning may be reduced. The reason that computer vision and image recognition have not reached to the level of the human being until recently is because of such a recognition rate problem and frequent errors.

Deep Learning-Technology That Implements Complete Machine Learning

What gave inspiration to an artificial neural network, which is another algorithm that early machine learning researchers made, is the biological characteristics of a human brain, particularly a neuron connection structure. However, the artificial neural network has uniform layer connection and data propagation direction, unlike the brain in which physically adjacent neurons can be connected to each other.

For example, when an image is cut into a great number of tiles and the tiles are input to a first layer of the neural network, the neurons repeat a process of transmitting data to the next layer until a final output is generated by the last layer. A weight indicating input accuracy based on a task that is performed is assigned to each neuron, and after that, all weights are summed, whereby final output is determined. For the stop sign, characteristics of the image, such as the octagonal shape, red color, displayed letters, size, and motion thereof, are finely cut and "inspected", by the neurons, and the duty of the neural network is to determine whether this is a stop sign. Here, a "provability vector" that predicts the result according to the weights based on sufficient data is utilized.

Deep learning, which is artificial intelligence developed from an artificial neural network, learns data utilizing information input and output layers similar to neurons of a brain. Since even a basic neural network required an awesome amount of operation, however, commercialization of deep learning faced difficulties from the beginning. Nevertheless, research has continued, and parallelization of an algorithm improving the concept of deep learning based on a super computer was successful. The advent of a GPU optimized for parallel operation has epochally accelerated the operating speed of the neural network, whereby artificial intelligence based on true deep learning appeared.

There is a high possibility of the neural network giving a great number of wrong answers during "learning". Back to the example of the stop sign, hundreds, thousands, or millions of images may be learned in order to accurately adjust neuron input weights so as to always give correct answers irrespective of weather conditions and change of day and night. It can be seen that the neural network has sufficiently learned the stop sign only when this level of accuracy was reached. In the year of 2012, Google and Professor Andrew NG at Stanford University implemented a "deep neural network" constituted by about one billion or more of neurons using 16,000 computers. 10 million images were picked and analyzed from YouTube therethrough, and the computers succeeded in classifying images of people and images of cats. The computers learned a process of recognizing and determining the shape and appearance of the cats displayed on the screens by themselves.

Image recognition ability of a system trained through deep learning has already gone ahead of a human being. In addition, ability of recognizing cancer cells in blood and ability of recognizing tumors through MRI scanning are included in the deep learning area. AlphaGo of Google learned the fundamentals of baduk, which is a Korean strategy board game, and further strengthened the neural network while repeatedly playing games with AI like itself. As the result of the advent of deep learning, practicality of machine learning has been reinforced, and the artificial intelligence area was extended. Deep learning subdivides a task in all supportable manners through a computer system. Deep learning-based technologies, such as a car without a driver, better preventive healthcare, and more accurate movie recommendation, have already been used in our daily life or are about to be put into practice. Deep learning is evaluated as the present and future of artificial intelligence having potential power capable of realizing general AI that appeared in science fiction.

Hereinafter, deep learning will be described in more detail.

Deep learning, which is a kind of artificial neural network (ANN) using a human neural network theory, is a machine learning model or an algorithm set referring to a deep neural network (DNN) configured to have a layered structure in which at least one hidden layer (hereinafter referred to as an "intermediate layer") is provided between an input layer and an output layer. Briefly, deep learning may be an artificial neural network having deep layers.

A human brain is estimated to be constituted by 25 billion nerve cells, each nerve cell (neuron) refers to one neuron constituting the neural network. One neuron includes one cell body, one axon or nurite, which is a protrusion of the cell body, and several dendrites or protoplasmic processes. Information exchange between neurons is performed through a synapse, which is a junction between neurons. Although one neuron is very simple, a group of neurons may have human intelligence. The dendrites are inputs configured to receive signals sent by other neurons, and the axon, which is a portion extending from the cell body, is an output configured to transmit a signal to another neuron. The synapse is a connection portion configured to connect the axon and the dendrites, which transmit signals between neurons, to each other. Signals of the neurons are not unconditionally transmitted but are transmitted only when the intensity of each signal is a predetermined value (threshold) or more. That is, synapses have different connection intensities, and each synapse determines whether to transmit a signal.

An artificial neural network (ANN), which is one field of artificial intelligence, is a mathematical model modeled by imitating the brain structure (neural network) of biology (generally a human being). That is, the artificial neural network is implemented by imitating an information processing and transmission process of a biological neuron. The artificial neural network is implemented similarly to a manner in which a human brain solves problems, and the neural network has excellent parallelism, since the neurons independently operate. In addition, since information is dispersed in many connection lines, no great influence is exerted on all neurons even though some of the neurons have problems, and therefore the artificial neural network is resistant to a predetermined level of errors and has learning ability in a given environment.

A deep neural network, which is a descendant of the artificial neural network, is the latest version of the artificial neural network that goes beyond the existing limits and has achieved successes in areas in which a large number of artificial intelligence technologies suffered failures in the past. When describing modeling an artificial neural network by imitating a biological neural network, biological e modeled as nodes in terms of processing units, and synapses are modeled as weights in terms of connections, as shown in Table 1 below.

TABLE 1

| Biological neural network | Artificial neural network |
|---|---|
| Cell body | Node |
| Dendrite | Input |
| Axon | Output |
| Synapse | Weight |

FIG. 1 is a view illustrating a layered structure of an artificial neural network.

Like a plurality of biological neurons of a human being, not a single biological neuron, is connected to each other in order to perform a meaningful task, for an artificial neural network, individual neurons are also connected to each other via synapses, whereby a plurality of layers is connected to each other, wherein connection intensity between the respective layers may be updated using weights. The multilayered structure and connection intensity are utilized in a field for learning and recognition.

The respective nodes are connected to each other via links having weights, and the entire model performs learning while repeatedly adjusting weights. The weights, which are basic means for long-term memory, express importance of the respective nodes. The artificial neural network initializes the weights and updates and adjusts weights using a data set to be trained in order to train the entire model. When a new input value is input after training is completed, an appropriate output value is inferred. The learning principle of the artificial 1 network is a process in which intelligence is formed through generalization of experiences, and learning is performed in a bottom-up manner. When two or more (i.e. 5 to 10) intermediate layers are provided, as shown in FIG. 1, this means that the layers are deepened and is called a deep neural network, and a learning and inference model achieved through the deep neural network may be referred to as deep learning.

The artificial neural network may play a role to some extent even when the artificial neural network has one intermediate layer (generally referred to as a "hidden layer") excluding input and output. When problem complexity increases, however, the number of nodes or the number of layers must be increased. It is effective to increase the number of layers so as to provide a multilayered model; however, an available range is restrictive due to limitations in that efficient learning is impossible and the amount of calculation necessary to train the network is large.

As a result of overcoming existing limitations described above, however, the artificial neural network was configured to have a deep structure. Consequently, a complex and expressive model has been constructed, and epochal results have been announced in various fields, such as voice recognition, facial recognition, object recognition, and text recognition.

Figure 2:
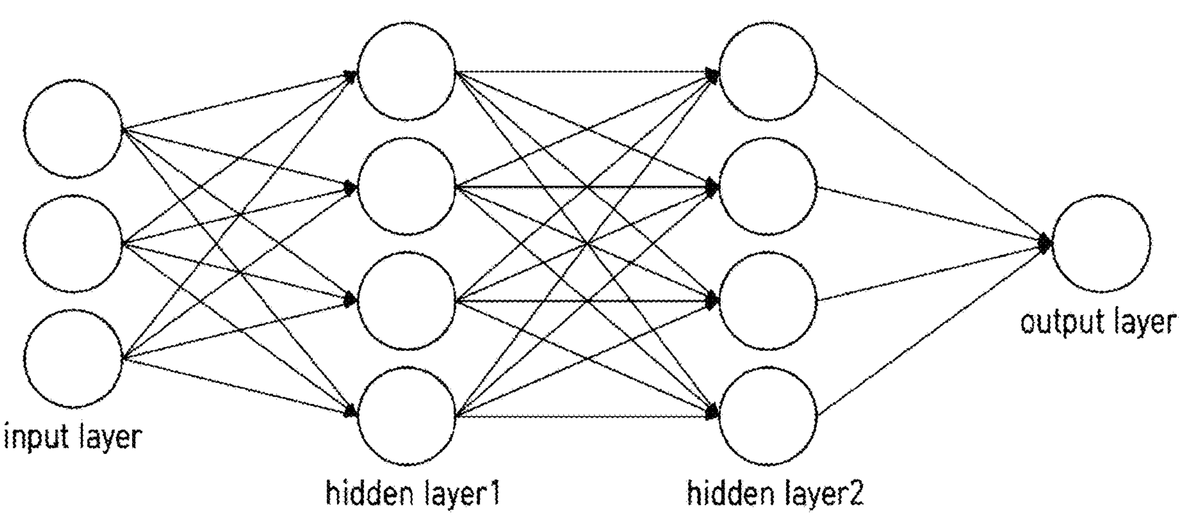
FIG. 2 is a diagram illustrating an example of a deep neural network.

FIG. 2 is a view showing an example of a deep neural network.

A deep neural network (DNN) is an artificial neural network (ANN) having several hidden layers between an input layer and an output layer. The deep neural network is a machine learning model or an algorithm set referring to a deep neural network (DNN) having at least one hidden layer between an input layer and an output layer. Connection of the neural network is achieved from the input layer to the hidden layer and from the hidden layer to the output layer.

The deep neural network may model complex non-linear relationships, like a general artificial neural network. For example, in a deep neural network structure for an object identification model, each object may be expressed as a layer construction of basic elements of an image. At this time, additional layers may rally characteristics of lower layers that are gradually gathered. This characteristic of the deep neural network enables complex data to be modeled using fewer units (nodes) than an artificial neural network that is operated similarly thereto.

Previous deep neural networks were generally designed as feedforward neural networks. In recent research, however, deep learning structures have been successfully applied to a recurrent neural network (RNN). As an example, there are cases in which the deep neural network structure was applied to the field of language modeling. A convolutional neural network (CNN) has been well applied to the field of computer vision, and successful application cases have been well documented. Furthermore, in recent years, the convolutional neural network has been applied to the field of acoustic modeling for automatic speech recognition (ASR), and it is evaluated that the convolutional neural network has been more successfully applied than existing models. The deep neural network may be trained using a standard error back-propagation algorithm. At this time, weights may be updated through stochastic gradient descent.

Various signals from the surrounding environment received by a human through sense organs may be expressed through a computer in the form of text, audio, image, and video and stored as data in a storage device inside the computer.

High-dimensional data corresponding to the text, audio, image, and video stored in the computer is data including a combination of consecutive 0s and 1s from a low-dimensional perspective, and is various structures, objects, or class instances defined in a programming language used by each program from a slightly higher-dimensional perspective of a computer program.

For training by artificial intelligence technology so far, it is necessary to extract, from high-dimensional data such as text, audio, image, and video acceptable by humans through computers, features which are data that may effectively express the high-dimensional data, and an implementation method and terminology for such feature data are different among various artificial intelligence models and various programming languages that may implement the artificial intelligence models.

The present invention is not limited to a specific conventional artificial intelligence model or a specific programming language capable of implementing an artificial intelligence model, and data that can effectively represent high-dimensional data is collectively referred to as a feature vector or representation. In particular, speech-related data may be referred to as speech representation.

Figure 3:
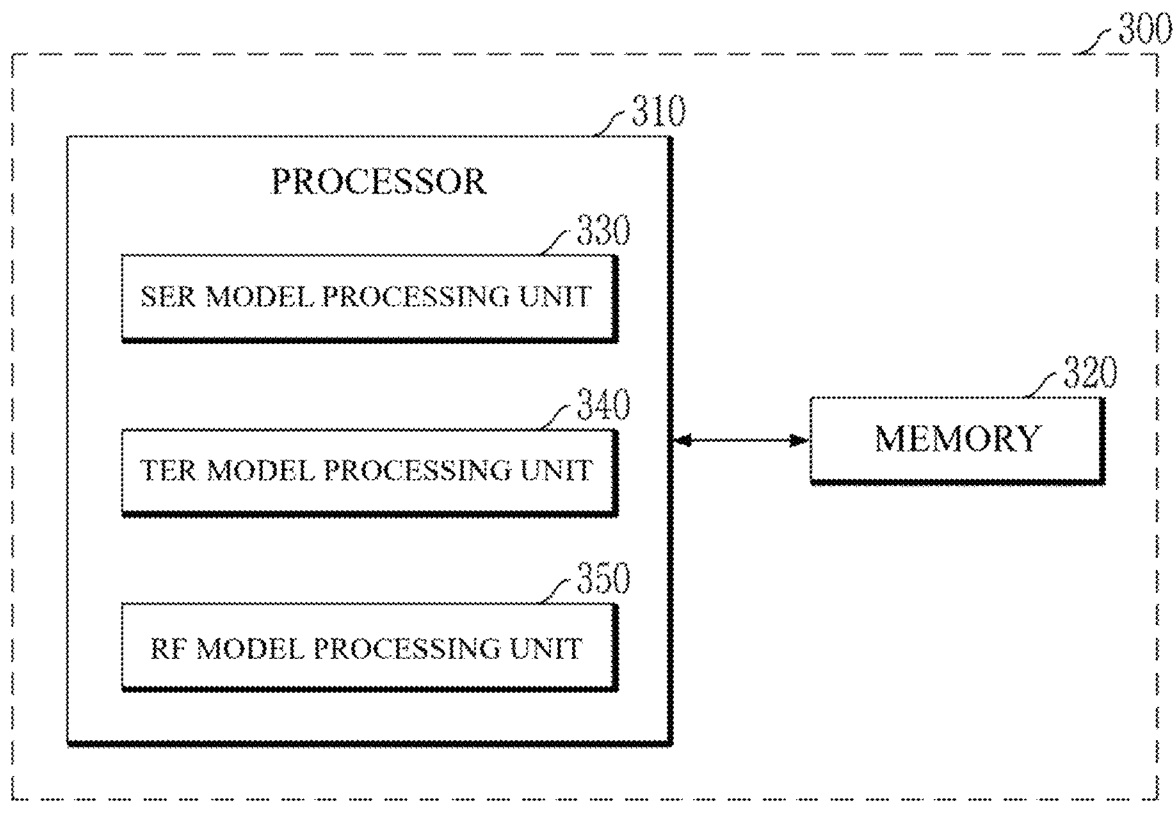
FIG. 3 is a block diagram for describing a function of an apparatus capable of estimating emotion of a user according to the present invention.

FIG. 3 is a block diagram for describing a function of an apparatus capable of estimating emotion of a user according to the present invention.

Referring to FIG. 3, an apparatus 300 capable of estimating emotion may include a processor 310 and a memory 320. In the present invention, the processor 310 may include an SER model processing unit 330, a TER model processing unit 340, an RF model processing unit 350, etc., and various necessary operations may be performed. For example, intermediate or final result information generated by each of the processing units 340 and 350 through a series of processes may be stored in the memory 320.

In the present invention, the memory 320 may store SER model information, TER model information, RF model information, and information necessary for a classifier and the processor 310 to estimate emotion. The memory 320 may store intermediate or final result product information generated through a series of processes by the SER model processing unit 330, the TER model processing unit 340, and the RF model processing unit 350.

In the present invention, the SER model processing unit 330 is a component that processes an SER model stored in the memory 320 on the processor 310, and may input a speaker identity feature and a speaker speech data feature to a predetermined SER model stored in the memory 320.

The speaker identity feature and the speaker speech data feature are key data including information allowing determination of emotion from a general speaker speech signal. In the present invention, when determining emotion of a speaker, data directly affecting emotion (for example, speaker identity feature and speaker speech data feature) is separated from other data (for example, phonetic feature (phonetic feature)), and only data directly affecting emotion is selected and input to a speech encoder 331 of the SER model, so that accuracy of user emotion estimation is improved.

The SER model processing unit 330 may encode the acquired speaker identity feature and speaker speech data feature through the speech encoder 331 in the SER model, and encode data before down-sampling of the speech encoder 331 including a down-sampling layer (down-sampler) through a disentangled feature encoder 333.

In general, in an artificial neural network model including an encoder and a decoder, a bottleneck phenomenon refers to a phenomenon that limits performance of a neural network. The bottleneck phenomenon may occur in the encoder or decoder part during a model training or inference process. Referring to a bottleneck phenomenon in the encoder, when the encoder insufficiently represents an input sequence in a down-sampling process of the encoder, insufficient information may be delivered to the decoder, limiting performance. Referring to a bottleneck phenomenon in the decoder, when the decoder improperly interprets encoded information during an up-sampling process of the decoder, final output may be inaccurate.

In the present invention, the SER model processing unit 330 operates to avoid a bottleneck phenomenon caused by down-sampling of the speech encoder 331 by using data before down-sampling of the speech encoder 331, so that emotion information included in a speech signal of the speaker may be fully reflected in the inference process.

In a field of artificial intelligence and machine learning, disentangled and entangled states are terms that describe properties of features or expressions in artificial intelligence and machine learning.

When a feature or expression is in a disentangled state, it means that respective dimensions are independent and separated from each other. In other words, since the respective dimensions represent different aspects of a system and do not interfere with each other, when the model has disentanglement features, changes in a specific dimension do not affect other dimensions and only specific properties of the dimension are reflected. When the respective features do not affect each other and independently change, clear separation is achieved in the entire feature space, which is useful in expression and understanding of data, enabling clearer understanding of a relationship between features. Further, the model may more powerfully generalize new environments or data, which is advantageous in improving performance of the model. In addition, adaptability in various situations may be increased, and an influence of noise affecting a certain feature may be inhibited from affecting another feature since features are separated from each other, which is advantageous in that the model may robustly operate with regard to noise. In addition, since features are independently learned, data may be efficiently utilized, which is advantageous in that a useful feature may be extracted even from a small amount of data.

When a feature or expression is in an entangled state, it means that respective dimensions interact with each other or interdependence thereof is increased. In other words, when one dimension changes, another dimension is affected, and specific features may be mixed with each other. Therefore, when the model has entanglement features, respective dimensions may be organically connected to each other. Further, it is difficult to understand a relationship between features, and generalization ability, robustness against noise, and data efficiency deteriorate. Therefore, a method has been studied to solve the entangled state, prefer expression f the disentangled state, and obtain the disentangled state in the field of artificial intelligence and machine learning.

In the present invention, the SER model processing unit 330 may encode a result of the speech encoder 331 through the disentangled feature encoder 333, and output a speech representation obtained by combining a speaker identity feature and a speaker speech data feature input to the SER model as a phonetic feature query, a phonetic feature key, and a phonetic feature value in the disentangled state. Referring to the speaker speech data feature encoded through the disentangled feature encoder 333, data unrelated to emotion may be excluded from the speaker identity feature and the speaker speech data feature, and only data related to emotion may be selected. By selecting only such data related to emotion through the disentangled feature encoder 333, the model of the present invention may expect effects such as strengthening of generalization ability, robustness against noise, and data efficiency mentioned above when inferring emotion of the user thereafter.

In the present invention, the TER model processing unit 340 may input a text feature acquired from transferred text corresponding to the speaker identity feature and the speaker speech data feature to a predetermined TER model stored in the memory 320, and output a text feature as a text feature query, a text feature key, and a text feature value through a text encoder 341.

In the present invention, the RF model processing unit 350 may input the phonetic feature query, the phonetic feature key, and the phonetic feature value output from the SER model processing unit 330, and the text feature query, the text feature key, and the text feature value output from the TER model processing unit 340 to a predetermined RF model stored in the memory 320.

Figure 5:
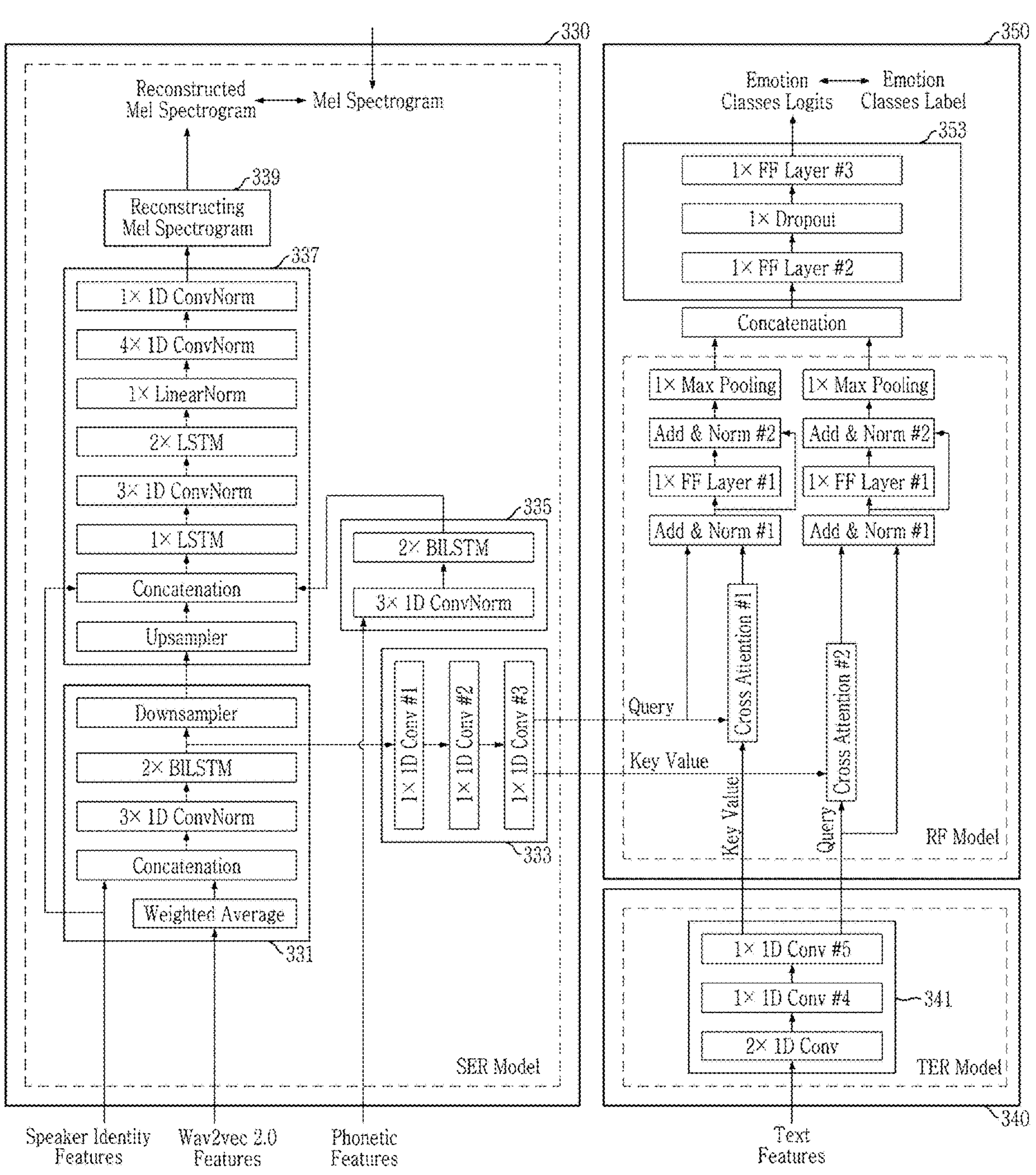
FIG. 5 is a diagram for schematically describing a method capable of estimating emotion of the user and a training method for estimating emotion according to an embodiment of the present invention.

The RF model processing unit 350 may apply a cross-attention mechanism to the RF model as an appropriate embodiment of the present invention. Here, the cross-attention mechanism may include at least one of a first cross-attention mechanism to which the phonetic feature query, the text feature key, and the text feature value are applied or a second cross-attention mechanism to which the text feature query, the phonetic feature key, and the phonetic feature value are applied, and FIG. 5 illustrates a configuration in which both the first cross-attention mechanism and the second cross-attention mechanism are applied to the RF model.

The RF model processing unit 350 may perform a function of outputting a probability for each emotion category using a result, which is output through the RF model, through a predetermined classifier 353 stored in the memory 320. The RF model processing unit 350 may output, to the user, an emotion category having a highest probability among probability values for each emotion category output through the classifier 353.

The RF model processing unit 350 may perform training by comparing a probability value for each emotion category output through the classifier 353 with a probability for each emotion category designated by a reference truth label.

The SER model processing unit 330 may input the acquired speaker identity feature, the acquired speaker speech data feature, the acquired phonetic feature (phonetic feature), and an acquired mel spectrogram to a predetermined SER model stored in the memory 320. Here, the acquired speaker identity feature, the acquired speaker speech data feature, the acquired phonetic feature (phonetic feature), and the acquired mel spectrogram may be acquired from the same speech data of the same speaker.

The SER model processing unit 330 may encode the acquired speaker identity feature and speaker speech data feature in the SER model through the speech encoder 331, and encode the acquired phonetic feature in the SER model through a phonetic feature encoder 335.

The SER model processing unit 330 may input a result encoded from the SER model through the speech encoder 331, the speaker identity feature, and the phonetic feature encoded through the phonetic feature encoder 335 to the speech decoder 337.

As an embodiment of the present invention, the SER model processing unit 330 may perform up-sampling by applying a result encoded from the SER model through the speech encoder 331 to the speech decoder 337, and concatenate the up-sampling result, the speaker identity feature, and the encoded phonetic feature. Here, a feature vector passing through the speech decoder 337 may undergo a bottleneck phenomenon through a down-sampler and an up-sampler included in the speech encoder 331 or the speech decoder 337 in the SER model. However, since a feature vector passing through the speech encoder 331, the speaker identity feature, and a feature vector passing through the phonetic feature encoder 335 are concatenated, loss and deformation of information due to a bottleneck phenomenon may be sufficiently compensated in the feature vector passing through the speech decoder 337.

The SER model processing unit 330 may reconstruct a feature vector that is a final result of the speech decoder 337 into a mel spectrogram through a mel spectrogram reconstruction unit 339.

The mel spectrogram reconstruction unit 339 may include a process of decoding a feature vector that is a final result of the speech decoder 337 into an audio signal, a process of converting the decoded audio signal into a spectrogram, and a process of converting the converted spectrogram into a mel spectrogram.

The SER model processing unit 330 may perform training by comparing a mel spectrogram acquired from speech utterance of the speaker with a mel output through the mel spectrogram reconstruction unit 339.

FIG. 4 is a diagram for schematically describing a probability of each emotion category, which is an output result of the apparatus 300 capable of estimating emotion of the user according to an embodiment of the present invention.

Referring to FIG. 4, the apparatus 300 capable of estimating emotion of the user according to the present invention may provide probabilities for six emotion categories classified as anger, disgust, fear, joy, sadness, and surprise, as an example. Among these categories, only the anger emotion having the highest emotion probability may be selected and output or provided.

FIG. 5 is a diagram for schematically describing a method capable of estimating emotion of the user and a training method for estimating emotion by the apparatus 300 according to an embodiment of the present invention.

The method capable of estimating user emotion by the apparatus 300 according to an embodiment illustrated in FIG. 5 will first be described.

Referring to FIG. 5, the processor 310 in the apparatus 300 capable of estimating emotion of the user may include the SER model processing unit 330, the TER model processing unit 340, and the RF model processing unit 350.

Referring to FIG. 5, a process of training by comparing a mel spectrogram output through the SER model and the mel spectrogram reconstruction unit 339 with a mel spectrogram acquired from a speech signal of the speaker is processed in the SER model processing unit 330, a TER model is processed in the TER model processing unit 340, and a process of training by comparing emotion designated by the RF model, the classifier 353, and a reference truth label with estimated emotion is processed in the RF model processing unit 350.

In FIG. 5, the SER model processing unit 330 acquires a speaker identity feature, a speaker speech data feature, a phonetic feature, and a mel spectrogram, which all may be extracted to include a segment of a predetermined frame from speech utterance of the speaker.

The SER model processing unit 330 may set the speaker identity feature to include an embedding of a predetermined dimension for each utterance, and may be acquired through Resemblyzer, as an example. The speaker speech data feature may be acquired through a pre-trained Wav2vec2.0 model as an example, and the acquired speaker identity feature and speaker speech data feature may be input to the SER model.

Referring to FIG. 5, the speech encoder 331 of the SER model may generally include a configuration of a weighted average layer in which hyperparameters are adjusted to more effectively extract a speaker speech data feature of Wav2vec2.0, a concatenate layer that combines a result of the weighted average layer and the acquired speaker identity features, a one-dimensional convolutional normalization layer including three filters, two bidirectional LSTM layers, and a down-sampler layer.

The SER model processing unit 330 may input the encoded speaker identity feature and speaker speech data feature before a down-sampling step of the speech encoder 331 to the disentangled feature encoder 333 and output a feature query, a phonetic feature key, and a phonetic feature value. In addition, the disentangled feature encoder 333 may include a configuration of first, second, and third one-dimensional convolution layers each including one filter.

Referring to FIG. 5, the TER model processing unit 340 may input a text feature acquired from transferred text corresponding to the speaker identity feature and the speaker speech data feature to the TER model. Here, a maximum token length of the transferred text may be set to a predetermined size, and the text feature may be a feature extracted through a pre-trained Bert-Large version.

Referring to FIG. 5, the text encoder 341 of the TER model may include a one-dimensional convolution layer including two filters, and fourth and fifth one-dimensional convolution layers each including one filter.

The TER model processing unit 340 may input a text feature to the text encoder 341 and output a text feature query, a text feature key, and a text feature value.

Referring to FIG. 5, the RF model may include a configuration of a first Add & Normalization layer, one feedforward layer, a second Add & Normalization layer, and one max pooling layer that may be applied to the first cross-attention mechanism, the second cross-attention mechanism, and a result of each cross-attention mechanism.

Referring to FIG. 5, the classifier 353 may be connected by applying a combination layer to a final maximum pooled result of a result of the first cross-attention mechanism and the second cross-attention mechanism of the RF model, and may include configurations of one feedforward layer, one dropout layer, and one feedforward layer.

According to FIG. 5, the RF model processing unit 350 may include a configuration of a first cross-attention mechanism to which the phonetic feature query, the text feature key, and the text feature value are applied and a second cross-attention mechanism to which the text feature query, the phonetic feature key, and the phonetic feature value are applied as a configuration of a cross-attention mechanism applied to the RF model.

In other words, referring to speech, text representation $h^{(M)} \in R^{t^{(M)} \times E}$, a query, a key, and a value, $M \in \{A,T\}$ may express each modality as in Equation 1 through linear projection.

$$q^{(A)}, q^{(T)} = w_q^{(A)} h_q^{(A)}, w_q^{(T)} h_q^{(T)} \quad \text{[Equation 1]}$$

$$k^{(A)}, k^{(T)} = w_k^{(A)} h_k^{(A)}, w_k^{(T)} h_k^{(T)}$$

$$v^{(A)}, v^{(T)} = w_v^{(A)} h_v^{(A)}, w_v^{(T)} h_v^{(T)}$$

The interest importance of the cross-attention mechanism may be applied together with a SoftMax function to derive an interest score probability. This probability is reflected in a value, which represents information propagated from audio and is reflected in a value $$C_h^{M \to M'} \in R^{t^{(M)} \times E}$$

to represent information propagated from audio to text or from text to audio. $C_h$ is a single head attention, eight multiple head attentions may be used, single head attentions may be connected to each other, and this process may be calculated as in Equation 2.

$$C_h^{(A \to T)} = \text{softmax}\left(q^{(T)} k^{(A)} / \sqrt{d}\right) v^{(A)} \quad \text{[Equation 2]}$$

$$C_h^{(T \to A)} = \text{softmax}\left(q^{(A)} k^{(T)} / \sqrt{d}\right) v^{(T)}$$

$$C^{M \to M'} = FeedForward\left(\text{Concatenate}\left(C_1^{M \to M'}, \ldots, C_h^{M \to M'}\right)\right)$$

The information calculated through the above process is applied to a feature of a query form, and in the first Add & Normalization layer applied to each cross-attention mechanism, a relationship between forms may be calculated as shown in Equation 3.

$$h^{(A)} = LayerNorm\left(h_q^{(A)} + C^{(T \to A)}\right) \quad \text{[Equation 3]}$$

$$h^{(T)} = LayerNorm\left(h_q^{(T)} + C^{(A \to T)}\right)$$

The two expressions may each be global-max-pooled and concatenated for input to the classifier 353, and a first feedforward layer, the second Add & Normalization layer, a max-pooling layer, and a subsequent concatenate layer each applied to the cross-attention mechanism may be calculated as in Equation 4.

$$h^{(A)} = LayerNorm\left(h^{(A)} + FeedForward\left(h^{(A)}\right)\right) \quad \text{[Equation 4]}$$

$$h^{(T)} = LayerNorm\left(h^{(T)} + FeedForward\left(h^{(T)}\right)\right)$$

$$h = \text{Concatetate}\left(MaxPool\left(h^{(A)}\right), MaxPool\left(h^{(T)}\right)\right)$$

As a result, the representation h is a final result of the FR model, and the representation includes information about a relationship between two forms for emotion recognition.

According to FIG. 5, the RF model processing unit 350 may perform a function of outputting the probability for each emotion category through the classifier 353 for the result output through the RF model. In addition, the RF model processing unit 350 may output an emotion category having a highest probability among probability output values for respective emotion categories to the user through the classifier.

Referring to FIG. 5, the speech decoder 337 of the SER model may include configurations of an up-sampler layer, a concatenate layer that combines a result of the up-sampler layer, the acquired speaker identity feature, and the encoded phonetic feature, one unidirectional LSTM layer, a one-dimensional convolutional normalization layer including three filters, two unidirectional LSTM layers, one linear normalization layer, a one-dimensional convolutional normalization layer including four filters, and a one-dimensional convolutional normalization layer including one filter.

Referring to FIG. 5, the phonetic feature encoder 335 of the SER model may include configurations of a one-dimensional convolutional normalization layer including three filters and two bidirectional LSTM layers.

According to FIG. 5, the SER model processing unit 330 may perform an up-sampling step by applying a result encoded through the speech encoder 331 in the SER model to the speech decoder 337, and concatenate the up-sampled result with the speaker identity feature and the encoded phonetic feature. The concatenated feature vector includes all of the up-sampled feature vector, speaker identity feature vector, and encoded phonetic feature vector of the speech encoder 331, and the number of dimensions is the sum of all dimensions of the concatenated feature vectors. There is an effect in that a result that may undergo a bottleneck phenomenon through a down-sampling step and an up-sampling step included in the speech encoder 331 and the speech decoder 337 of the SER model is combined with the speaker identity feature and the encoded phonetic feature in the concatenate layer of the speech decoder 337 to complement accuracy of final output of the speech decoder 337.

A description will be given of a method of performing training to estimate user emotion by the apparatus 300 according to the embodiment illustrated in FIG. 5.

According to FIG. 5, the SER model processing unit 330 may include a step of designating a mel spectrogram acquired from speech utterance of the speaker as a reference truth label and performing training through supervised leaning using a mel spectrogram output through the mel spectrogram reconstruction unit 339.

In the mel spectrogram output through the mel spectrogram reconstruction unit 339, loss and deformation of information of a feature vector passing through the speech decoder 337 due to a bottleneck phenomenon are sufficiently complemented. Therefore, a learning model for estimating emotion of the user according to the present invention trained by designating a mel spectrogram acquired from a speech signal of the speaker as a reference truth label has significantly high robustness against noise and accuracy of emotion reference.

According to FIG. 5, the RF model processing unit 350 may include a step of performing training using a probability value for each emotion category output through the classifier 353 as a probability value for each emotion category designated as a reference truth label, and may include a step of performing training using one emotion category having a highest probability among probability values for respective emotion categories output through the classifier 353 and one emotion category designated as a reference truth label.

Referring to FIG. 5, a difference between the mel spectrogram acquired from the speech utterance of the speaker designated as the reference truth label in the SER model processing unit 330 and the mel spectrogram output through the mel spectrogram reconstruction unit 339 may be defined as first loss, and a difference between emotion category data designated as a reference truth label in the RF model processing unit 350 (including a probability value for each emotion category and one emotion category having a highest probability) and emotion data output through the classifier 353 (including a probability value for each emotion category and one emotion category having a highest probability) may be defined as second loss. In addition, the sum of the first loss and the second loss may be defined as the total loss of the model according to an embodiment of the present invention, and may be used for training by applying a predetermined loss function to minimize the total loss.

Table 2 below is a table illustrating accuracy of the apparatus for estimating emotion according to the present invention.

TABLE 2

| Model | UA (unweighted accuracy) | WA (weighted accuracy) |
|---|---|---|
| ASR-SER | 69.7 | 68.6 |
| Learning alignment | 70.9 | 72.5 |
| STSER | 72.05 | 71.06 |
| CMA + Raw waveform | 72.8 | — |
| Model according to present invention | 73.83 | 74.65 |

Referring to Table 2, the data used is a result of using the interactive emotional dyadic motion capture database (IEMOCAP), and this data is currently the most actively used data set in emotion recognition research using speech and is a result of performing five-fold cross-validation for a total of four emotions (happiness, sadness, anger, and neutral) as evaluation indicators. Each of ASR-SER, learning alignment, STSER, and CMA+Raw waveform is a result of estimating emotion recognition using conventional technology, and the model according to the present invention is a result acquired by applying a data set to the present invention. As shown in Table 2, an emotion estimation result of the apparatus to which the present invention is applied exhibits a significantly higher accuracy estimation result than that of the conventional technology in both UA (Unweighted Accuracy) and WA (Weighted Accuracy).

As previously described, the high performance of the artificial intelligence model according to the present invention may be interpreted as performance improvement as a result of selectively using a feature directly affecting emotion when determining emotion of the speaker, using data to which a disentangled feature is applied by utilizing and applying a result before the down-sampling step to the disentangled feature encoder 333 in the SER model, avoiding and complementing a bottleneck phenomenon that may occur in the speech encoder 331 and the speech decoder 337 in machine learning by combining a speaker identity feature and a phonetic feature acquired after the up-sampling step in the SER model, and effectively fusing heterogeneous modalities corresponding to speech and text by utilizing a disentangled feature.

Effects of the apparatus and method for estimating emotion of the user and a method of training the apparatus for estimating emotion according to embodiments of the present invention are as follows.

The multimodal emotion recognition proposed in the present invention increases accuracy of emotion analysis by combining various data sources. For example, more accurate understanding of emotion is provided by simultaneously analyzing tone of speech and content of language.

In addition, according to an embodiment of the present invention, it is possible to capture subtle emotional nuances that are difficult to detect using a single modality, and this makes it possible to easily identify emotion of the user even in complex cases having particularly delicate emotional states or conflicting emotional signals.

In addition, a multimodal system according to the present invention better understands context of a situation by integrating information provided by various modalities. This has an advantage of making emotion recognition more accurate and in-depth, and thus contextual understanding is strengthened.

In addition, a multimodal approach method according to the present invention may maintain or improve accuracy of emotion recognition even in a situation where a single modality may fail. For example, when speech data is unclear, text data may be used for complementation thereof.

In addition, multimodal emotion recognition according to the present invention may be applied to various application fields, such as health care, education, customer service, and entertainment. In this way, user experience is improved and interactions between humans and machines become more natural.

In addition, multimodal emotion recognition according to the present invention may aid in better understanding of interactions and communication methods between people. This provides important insights into the study of human behavior.

The effects that may be obtained from the invention are not limited to the effects mentioned above, and other effects not mentioned herein may be clearly understood by those skilled in the art from the above description.

The embodiments described above are predetermined combinations of elements and features of the present invention. Each element or feature must be considered to be optional unless explicitly mentioned otherwise. Each element or feature may be implemented in a state of not being combined with another element or feature. In addition, some elements and/or features may be combined to constitute an embodiment of the present invention. The sequence of operations described in the embodiments of the present invention may be changed. Some elements or features in a certain embodiment may be included in another embodiment, or may be replaced with corresponding elements or features in another embodiment. It is obvious that claims having no explicit citation relationship may be combined to constitute an embodiment or may be included as a new claim by amendment after application.

The processing unit 310 may also be referred to as a controller, a microcontroller, a microprocessing unit, or a microcomputer. Meanwhile, the processing unit 310 may be implemented by hardware, firmware, software, or a combination thereof. When an embodiment of the present invention is implemented using hardware, application specific integrated circuits (ASICs), digital signal processing units (DSPs), digital signal processing devices (DSPDs), programmable logic devices (PLDs), or field programmable gate arrays (FPGAS), which are configured to perform the present invention, may be provided in the processing unit 310. An embodiment of the present invention may also be implemented in the form of a non-transitory computer-readable recording medium storing instructions executable by a computer or a processing unit or data.

Those skilled in the art will appreciate that the present invention may be embodied in other specific forms than those set forth herein without departing from essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention.

What is claimed is:

1. An apparatus for estimating emotion, the apparatus comprising:

a speech emotion representation (SER) model processing unit configured to input an acquired speaker identity feature and an acquired speaker speech data feature to a predetermined SER model, encode the speaker identity feature and the speaker speech data feature through a speech encoder in the SER model, and encode the encoded speaker identity feature and speaker speech data feature through a disentangled feature encoder to select data related to emotion and exclude data unrelated to emotion from the encoded speaker identity feature and the encoded speaker speech data feature, and output a phonetic feature query, a phonetic feature key, and a phonetic feature value of a speaker;

a text emotion representation (TER) model processing unit configured to input a text feature acquired from transferred text corresponding to the speaker identity feature and the speaker speech data feature to a predetermined TER model, and encode the text feature through a text encoder in the TER model to output a text feature query, a text feature key, and a text feature value of the text feature; and a representation fusion (RF) model processing unit configured to:

input the output phonetic feature query, phonetic feature key, and phonetic feature value of the speaker and the output text feature query, text feature key, and text feature value to a predetermined RF model;

apply a first cross-attention mechanism to the output phonetic feature query, text feature key, and text feature value;

apply a second cross-attention mechanism to the output text feature query, phonetic feature key, and phonetic feature value;

apply a first Add and Normalization layer, a first feedforward layer, a second Add and Normalization layer, and a first max pooling layer to an output of the first cross-attention mechanism;

apply a third Add and Normalization layer, a second feedforward layer, a fourth Add and Normalization layer, and a second max pooling layer to an output of the second cross-attention mechanism; and output a probability for each emotion category of the speaker based on outputs of the first and second max pooling layers.

2. The apparatus for estimating emotion according to claim 1, wherein the speaker identity feature and the speaker speech data feature encoded by the speech encoder in the SER model processing unit correspond to speech representation encoded before down-sampling is applied.

3. The apparatus for estimating emotion according to claim 1, wherein the cross-attention mechanism in the RF model processing unit comprises at least one of a first cross-attention mechanism to which the acquired phonetic feature query, text feature key, and text feature value are applied or a second cross-attention mechanism to which the acquired text feature query, phonetic feature key, and phonetic feature value are applied.

4. The apparatus for estimating emotion according to claim 1, wherein the RF model processing unit outputs, to the user, an emotion category having a highest probability among probability output values for respective emotion categories of the speaker.

5. The apparatus for estimating emotion according to claim 1, wherein the speaker speech data feature in the SER model processing unit is a wav2vec feature or a wav2vec2.0 feature extracted from a predetermined speech recognition pre-learning model.

6. A method of estimating emotion of a user, the method comprising:

inputting an acquired speaker identity feature and an acquired speaker speech data feature to a predetermined SER model;

encoding the speaker identity feature and the speaker speech data feature through a speech encoder in the SER model;

encoding the encoded speaker identity feature and speaker speech data feature through a disentangled feature encoder to select data related to emotion and exclude data unrelated to emotion from the encoded speaker identity feature and the encoded speaker speech data feature;

outputting a phonetic feature query, a phonetic feature key, and a phonetic feature value of a speaker;

inputting a text feature acquired from transferred text corresponding to the speaker identity feature and the speaker speech data feature to a predetermined TER model;

encoding the text feature through a text encoder in the TER model to output a text feature query, a text feature key, and a text feature value of the text feature;

inputting the output phonetic feature query, phonetic feature key, and phonetic feature value of the speaker and the output text feature query, text feature key, and text feature value to a predetermined RF model;

applying a first cross-attention mechanism to the output phonetic feature query, text feature key, and text feature value;

applying a second cross-attention mechanism to the output text feature query, phonetic feature key, and phonetic feature value;

applying a first Add and Normalization layer, a first feedforward layer, a second Add and Normalization layer, and a first max pooling layer to an output of the first cross-attention mechanism;

applying a third Add and Normalization layer, a second feedforward layer, a fourth Add and Normalization layer, and a second max pooling layer to an output of the second cross-attention mechanism; and outputting a probability for each emotion category of the speaker based on outputs of the first and second max pooling layers.

7. The method according to claim 6, wherein, in the encoding the speaker identity feature and the speaker speech data feature through a speech encoder, the speaker identity feature and the speaker speech data feature encoded by the speech encoder correspond to speech representation encoded before down-sampling is applied.

8. The method according to claim 6, wherein the outputting a probability for each emotion category of the speaker comprises applying at least one of a first cross-attention mechanism to which the acquired phonetic feature query, text feature key, and text feature value are applied or a second cross-attention mechanism to which the acquired text feature query, phonetic feature key, and phonetic feature value are applied.

9. The method according to claim 6, wherein the outputting a probability for each emotion category of the speaker comprises outputting, to the user, an emotion category having a highest probability among probability output values for respective emotion categories of the speaker.

10. The apparatus for estimating emotion according to claim 1, wherein the speaker identity feature in the SER model processing unit is extracted from Resemblyzer.

* * * * *